(12) United States Patent
Kreutz et al.

(10) Patent No.: US 10,717,458 B2
(45) Date of Patent: Jul. 21, 2020

(54) ADJUSTABLE STEERING COLUMN FOR MOTOR VEHICLES, HAVING AN ENERGY ABSORPTION DEVICE

(71) Applicants: THYSSENKRUPP PRESTA AG, Eschen (LI); thyssenkrupp AG, Essen (DE)

(72) Inventors: Daniel Kreutz, Feldkirch (AT); Sebastian Forte, Mauren (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 64 days.

(21) Appl. No.: 15/778,591

(22) PCT Filed: Dec. 6, 2016

(86) PCT No.: PCT/EP2016/079900
§ 371 (c)(1),
(2) Date: May 23, 2018

(87) PCT Pub. No.: WO2017/102440
PCT Pub. Date: Jun. 22, 2017

(65) Prior Publication Data
US 2018/0354546 A1 Dec. 13, 2018

(30) Foreign Application Priority Data
Dec. 16, 2015 (DE) .................. 10 2015 225 488

(51) Int. Cl.
*B62D 1/18* (2006.01)
*B62D 1/19* (2006.01)
*B62D 1/184* (2006.01)

(52) U.S. Cl.
CPC ............ *B62D 1/195* (2013.01); *B62D 1/184* (2013.01)

(58) Field of Classification Search
CPC ................ B62D 1/195; B62D 1/184
(Continued)

(56) References Cited

U.S. PATENT DOCUMENTS

| 6,394,493 B1 * | 5/2002 | Kieserling ............ B62D 1/189 280/775 |
| 2003/0145675 A1 * | 8/2003 | Hobaugh, II .......... B62D 1/184 74/493 |

(Continued)

FOREIGN PATENT DOCUMENTS

| CN | 104955711 A | 9/2015 |
| DE | 202008015444 U | 2/2009 |

(Continued)

OTHER PUBLICATIONS

English Translation of International Search Report issued in PCT/EP2016/079900, dated Mar. 17, 2017 dated Mar. 28, 2017).

*Primary Examiner* — Paul N Dickson
*Assistant Examiner* — Hilary L Johns
(74) *Attorney, Agent, or Firm* — thyssenkrupp North America, LLC

(57) ABSTRACT

A displaceable steering column for motor vehicles may include an actuating unit in which a steering shaft is rotatably mounted. The actuating unit may be displaceable relative to a holding unit in the axial direction of the steering shaft, and optionally in the vertical direction, and can be clamped by means of a clamping device so that the actuating unit is fixed in an non-displaceable manner when the motor vehicle is operating normally. The steering column may also include an energy absorption device disposed between the actuating unit and the holding unit, which in the event of a vehicle crash absorbs at least part of the energy applied to the steering column by material deformation of an energy absorber. The energy absorption device may have a central portion on which an energy absorber is disposed and is (Continued)

engaged with the actuating unit. The central portion may be connected to a clamping portion that can be clamped by the clamping device.

10 Claims, 4 Drawing Sheets

(58) Field of Classification Search
USPC .......................................................... 280/777
See application file for complete search history.

(56) References Cited

U.S. PATENT DOCUMENTS

| | | |
|---|---|---|
| 2004/0232685 A1 | 11/2004 | Gatti |
| 2006/0290128 A1 | 12/2006 | Ridgway |
| 2008/0290641 A1 | 11/2008 | Galehr |
| 2010/0307280 A1 | 12/2010 | Schnitzer |
| 2011/0100761 A1 | 5/2011 | Dudde |
| 2011/0115206 A1* | 5/2011 | Sulser .................... B62D 1/184 280/775 |
| 2012/0024101 A1* | 2/2012 | Schnitzer ............... B62D 1/195 74/492 |
| 2014/0020502 A1 | 1/2014 | Schnitzer |
| 2014/0346761 A1* | 11/2014 | Schnitzer ............... F16M 13/02 280/779 |
| 2015/0000456 A1* | 1/2015 | Schnitzer ................ B62D 1/16 74/493 |
| 2015/0047456 A1 | 2/2015 | Heitz |
| 2015/0344064 A1 | 12/2015 | Tanaka |
| 2016/0280159 A1* | 9/2016 | Kakita .................. B60R 16/027 |

FOREIGN PATENT DOCUMENTS

| | | |
|---|---|---|
| DE | 102014101631 B | 6/2015 |
| DE | 102014108577 B | 9/2015 |
| EP | 1464560 A | 10/2004 |
| EP | 1479593 A | 11/2004 |
| EP | 1940670 A | 7/2008 |
| EP | 2259957 A | 12/2010 |

* cited by examiner

ADJUSTABLE STEERING COLUMN FOR MOTOR VEHICLES, HAVING AN ENERGY ABSORPTION DEVICE

CROSS REFERENCE TO RELATED APPLICATIONS

This application is a U.S. National Stage Entry of International Patent Application Serial Number PCT/EP2016/079900, filed Dec. 6, 2016, which claims priority to German Patent Application No. DE 10 2015 225 488.7, filed Dec. 16, 2015, the entire contents of both of which are incorporated herein by reference.

FIELD

The present disclosure generally relates to steering columns, including displaceable steering columns for motor vehicles that have an actuating unit in which a steering shaft is rotatably mounted.

BACKGROUND

The problem sought to be addressed by steering columns with energy absorption devices is that of absorbing, in a controlled manner, the energy applied to the steering column by the driver when the vehicle is involved in a head-on collision.

A steering column with an energy absorption device is known from DE 20 2008 015 444 U1, in which the actuating unit is coupled and uncoupled in respect of the holding unit by means of a locking hook, so that the longitudinal adjustability of the actuating unit in respect of the holding unit is guaranteed in the uncoupled state and in the coupled state the energy absorption element is coupled in the power flow. The disadvantage of this solution is the complex design and the fact that during coupling the locking hook sometimes does not engage with a form-fitting recess of the energy absorption element and in the event of a crash it must initially be displaced without energy absorption until it engages with a form-fitting recess.

Thus a need exists for a steering column that comprises an improved energy absorption device with a simple, operationally reliable design.

DETAILED DESCRIPTION

Figure 1:
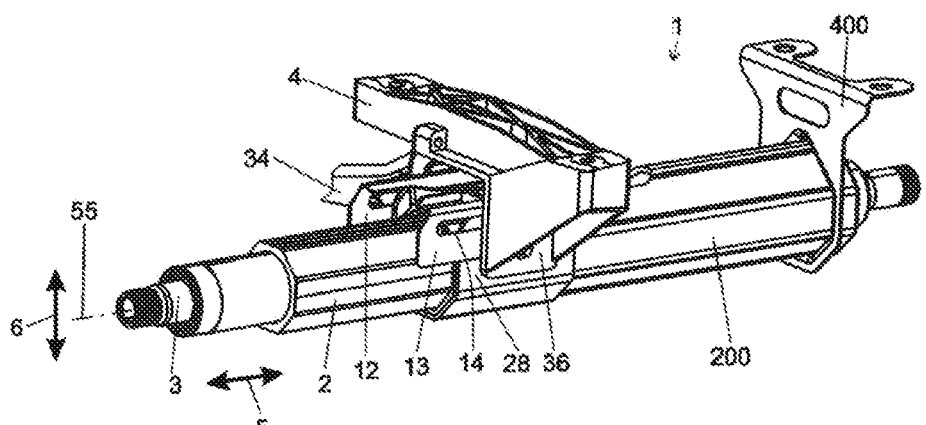
FIG. 1 is a perspective view of an example steering column in a completely extended state during normal operation with a bending/tear lug.
Figure 2:
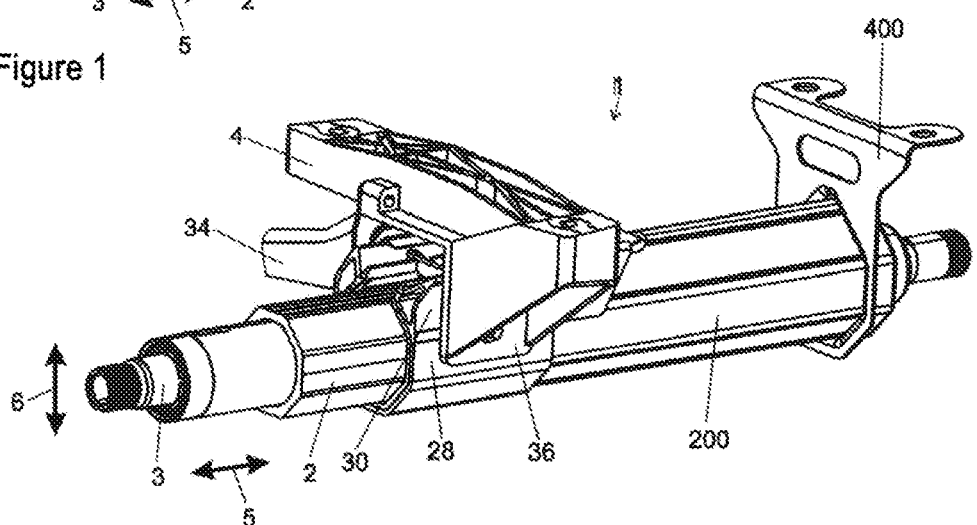
FIG. 2 is a perspective view of the example steering column in a completely compressed state during normal operation.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a displaceable steering column for a motor vehicle having an actuating unit in which a steering shaft is rotatably mounted. The actuating unit may be displaceable in respect of a holding unit fixed to the vehicle body in the axial direction of the steering shaft and can be clamped by means of a clamping device, so that the actuating unit is fixed in a non-displaceable manner in respect of the holding unit when the motor vehicle is operating normally. An energy absorption device may be arranged between the actuating unit and the holding unit.

In some examples, the energy absorption device has a central portion on which at least one energy absorber is arranged, wherein the energy absorber is coupled with the actuating unit, and that the central portion is connected to at least one clamping portion which can be clamped by means of the clamping device. Rather than a special latching mechanism, as in the prior art, the present invention advantageously uses the clamping device which is in any event present in order to allow displacement of the actuating unit in respect of the holding unit in a release position of the clamping device and to fix the actuating unit in respect of the holding part in a fixing position, wherein at the same time the clamping portion of the energy absorption device is also clamped and fixed, so that in the event of a vehicle crash with a relative displacement of the actuating unit and the holding unit, energy is absorbed by the energy absorption device. According to the invention, the clamping portion of the energy absorption device is coupled in the non-positive connection, also referred to as the frictional connection, produced by the clamping device between the actuating unit and the holding unit. In the fixing position of the clamping device, the clamping portion is frictionally coupled with a component of the steering column, for example the holding unit, which is non-displaceable during a crash. In other words, the clamping portion is coupled in a non-positive manner within the clamping contact produced by the clamping device in the fixing position, at least in the axial direction.

When the motor vehicle is operating normally, the steering column is in the fixing position and no crash scenario arises. In other words, the normal operation of the motor vehicle corresponds to the proper use of the motor vehicle without there being a head-on vehicle collision, also referred to as a crash scenario.

In the event of a head-on collision involving the vehicle, also referred to as a vehicle crash or crash, kinetic energy is applied by the driver via the steering wheel to the steering column, as a result of which through energy absorption by the energy absorption device the actuating unit is displaced in respect of the holding unit and the clamping portion of the energy absorption device. During the energy absorption process in the event of a crash the clamping device is located in its fixing position.

Various systems which provide a clamping hub can be used as the clamping device in order to achieve the desired clamping. An example of this is a cam clamping device. Cam clamping devices of this kind comprise a cam disk and a sliding plate, wherein these can be rotated relative to one another by means of an actuating lever. Furthermore, a tilting pin clamping device or a roller body clamping device may also be used as the clamping device.

The actuating unit is preferably received in a displaceable manner in a clamp unit. The clamp unit encloses the actuating unit and comprises a slot in the axial direction. By moving the clamping device from the release position into the fixing position, the actuating unit is clamped by the narrowing of the slot in the clamp unit. In the release position, the actuating unit can be displaced in respect of the holding unit. The displacement may take place in the axial direction and/or perpendicularly to the axial direction. The displacement perpendicular to the axial direction is used for setting the actuating unit in the vertical direction.

In an advantageous development, the clamp unit may be configured as an external casing tube.

In a preferred embodiment, the clamping portion can be clamped between two components that are unmoved relative to one another during the crash.

The clamping portion can therefore be clamped between a first component and a second component by means of the clamping device, wherein the two components are fixed relative to one another by the clamping device during the crash. In other words, there is no relative movement between the first component, the clamping portion and the second component during the crash.

The first component may preferably be formed by the holding unit, particularly preferably by a clamping jaw of the holding unit.

The second component may preferably be formed by the clamp unit or by the external casing tube. Alternatively, the second component may be configured as a clamping plate. The clamping plate may be arranged parallel to the clamping jaw of the holding unit. The clamping device interacts with the clamping plate in such a manner that said clamping plate is also clamped. Consequently, the clamping plate is also included in the force flow of the clamping device, so that the clamping portion is clamped between the clamping plate and the clamping jaw of the holding unit.

In the fixing position, the clamping portion is clamped between the first component and the second component so that there is a first frictional connection between the first component and the clamping portion. In this case, the normal force corresponds to the clamping force applied by the clamping device. Furthermore, between the second component and the clamping portion there is a further second frictional connection. Consequently, the clamping portion is held, i.e. fixedly clamped, between the first and second component by two frictional connections (frictional pairings). The two frictional connections mean that the frictional force acting against the displacement of the clamping portion when there is a predetermined clamping force which acts as a normal force can be doubled compared with a system with a single frictional connection (frictional pairing).

The actuating unit, on the other hand, is only held in the clamp unit via a single frictional pairing and the frictional force resulting from this. By contrast, the clamping portion is held by two frictional pairings and consequently by a frictional force which is twice as high between the first and second component. Consequently, in the event of a crash the static friction between the actuating unit and the clamp unit is overcome, so that the actuating unit is moved in respect of the clamp unit. In other words, the actuating unit slips through in the clamp unit. The clamping portion, unlike the actuating unit, is held by two frictional pairings, so that it remains securely in its clamped position without slipping through. Consequently, the actuating unit is displaced in respect of the clamping portion of the energy absorption device. The energy absorber arranged in the central region of the energy absorption device can absorb part of the energy applied through this displacement.

Even when the actuating unit has a non-circular cross-sectional profile, the secure fixing of the clamping portion can be guaranteed. For example, in the case of an octagonal profile there is an increase in friction compared with the circular cylindrical actuating units due to angular relationships. However, this increase is always smaller than that which can be provided by two frictional connections. Consequently, it can be ensured that during the crash the actuating unit is displaced in an axial direction relative to the clamping portion without the clamping portion slipping through between the first and the second component.

Through additional coatings and/or embodiments of the clamping portions, this frictional force between the two components and the clamping portion can be increased still further.

In other words, the frictional force with which the clamping portion is held between the first and the second component is greater than the frictional force with which the actuating unit is held in the clamp unit. The difference between the maximum static friction which fixes the clamping portion and the friction of the actuating unit in the clamp unit is the maximum amount that can be absorbed in addition by the energy absorber. In a preferred embodiment of the invention, the clamping portion is provided with an elongate hole for the passage of a clamping bolt of the clamping device. In this way, the clamping portion and therefore the entire energy absorption device can be displaced in the release position of the clamping device along the elongate hole and securely fixed in the fixing position by means of the clamping device acting via the clamping bolts.

A development of the invention envisages that a cam supported on the holding unit projects as an anti-rotational device for the clamping portion through the elongate hole thereof. The cam connected to the holding unit remains in its position in a non-displaceable manner during a displacement of the steering column in the release position of the clamping device together with the holding unit, while the clamping portion can be displaced in the axial direction of the steering shaft. During this process, the clamping portion with its elongate hole moves in respect of the cam and, at the same time, the clamping bolt. Since the cam and the clamping bolt project through the same elongate hole spaced apart from one another, they define a movement direction of the elongate hole so that the clamping portion and therefore the entire energy absorption device are not rotatable.

The invention is further improved by the measure that two clamping portions are arranged on opposite sides of the central portion and extend substantially parallel to one another and are spaced apart from one another. "Substantially parallel" should be understood to mean a deviation of up to ±10° from an exactly parallel configuration. While the central portion on the upper side of the actuating unit extends transversely beyond the actuating unit, the two clamping portions both protrude downwards and extend at least partially beyond the left and right side of the actuating unit, so that they can be clamped on both sides of the actuating unit along with said actuating unit by means of the clamping device between two lateral clamping jaws of the holding unit. Each clamping portion is preferably clamped between one of the clamping jaws and the clamp unit in each case, so that two further frictional pairings are provided. In other words, each clamping portion is fixed by two frictional pairings in each case, so that the energy absorption device is prevented from a displacement (slipping through) during the crash by four frictional pairings. Due to the symmetrical arrangement of the two clamping portions, in the event of a crash there is a substantially symmetrical loading of the energy absorption device, as a result of which the risk of bending or even of tearing of the clamping portions from the central portion is removed.

In a further embodiment of the invention, at least one clamping portion is provided with a roughening or fluting or toothing or a series of apertures. These measures ensure that the force needed in order to pull the clamping portion out of the clamping engagement is increased in relation to the clamping force of the clamping device and the functional reliability is therefore increased. In other words, the frictional pairing is improved in that the frictional coefficient is increased.

In a preferred embodiment of the invention, the energy absorber is configured as a bending tab or a tear tab or a bending/tear tab which emerges from the central portion and is bent over at its free end, wherein the bent-over end is coupled with the actuating unit. In the case of a bending tab, energy is absorbed during the bending (reshaping) of the tab material. The bending takes place in that the coupled end is displaced along with the actuating unit, wherein the clamping portion remains in its position through the clamping and the friction provided by this. The relative movement between the bent-over end and the clamping portion brings about a deformation, as a result of which part of the applied energy is absorbed, in other words transformed into deformation work and heat. In the case of the tear tab, the tab edges are still connected to the surrounding material, so that the tear tab has to be torn out of the surrounding material, wherein energy is absorbed. The bending/tear tab combines the two energy absorption methods of the bending tab and the tear tab. All three embodiments, including the bent end for connection to the actuating unit, can be produced with the lowest possible production expense and particularly cost-effectively.

Another embodiment of the invention provides that the energy absorber is configured in the form of a sliding block that can be displaced in a slot, the width of said sliding block being greater than the width of the slot which is therefore widened by the sliding block during a displacement thereof, wherein the sliding block is connected to the actuating unit and projects through the slot which is arranged in the central portion of the energy absorption device. In this embodiment, the central portion of the energy absorption device only needs to be provided with a matching slot, which can easily be achieved cost-effectively by a single stamping action. The sliding bock may be configured in the form of a simple pin which can be anchored in an opening in the actuating unit provided for this purpose. In a kinematic reversal, it may be provided that a strip is configured in the central portion which is arranged between two bolt-like projections connected to the actuating unit. The displacement of the projections connected to the actuating unit in respect of the strip means that this strip is deformed by the projections. In this case, the projections exhibit a smaller space in respect of one another than the width of the strip. In other words, the strip is pulled through the projections.

In a particularly easy-to-produce and cost-effective embodiment of the invention, the energy-absorbing device is configured as a punched/bent sheet-metal part, preferably of one-piece design. An embodiment of this kind may be produced from a piece of sheet metal using a small number of punching and bending actions. Quite particularly preferably, the energy absorption device is a single integral punched/bent sheet-metal part.

In order to improve the clamping action of the clamping device, it is proposed that the clamping jaw of the holding unit comprises two plates. In this way, the frictional fixing of the clamping portion of the energy absorption device is improved.

The aforementioned measure can be further improved if the clamping surfaces of the plates are provided with a roughening or a friction-improving coating. The same also applies to a friction disk to be arranged between the plates. All these measures improve friction between the components that are displaceable in the release position of the clamping device and the fixed components which are connected to the holding unit when the clamping device is moved into the fixing position. This takes place by means of an actuating lever for which the forces required for operation by the operator should be felt to be comfortable. The operating forces of the lever are therefore limited and consequently also the clamping force of the clamping device. The aforementioned measures ensure that with the predetermined clamping force of the clamping device, the tearing force required in order to overcome the clamping grip is increased and the components which are displaceable in the release position are therefore fixed more rigidly and securely in the fixing position.

FIGS. 1 to 4 show the design of the displaceable steering column 1 for motor vehicles according to the invention. A steering shaft 3 is rotatably mounted in an actuating unit 2. The actuating unit 2 is displaceable in respect of a holding unit 4 fixed to the vehicle body in an axial direction 5 of the steering shaft 3 and in the present case also in the vertical direction 6. The actuating unit 2 is displaceably received in the axial direction in an external casing tube 200, wherein the external casing tube can be attached to a vehicle which is not shown by a front bracket 400. During a displacement of the actuating unit 2 in the vertical direction 6, an elastic deformation of the front bracket 400 takes place, in order to allow pivoting. Alternatively, a pivot axis may also be provided between the front bracket and the external casing tube 200.

The actuating unit 2 may be fixed in respect of the holding unit 4 by means of a clamping device 7. The clamping device 7 essentially comprises a clamp unit 28 enclosing the actuating unit 2, the upper ends 29, 30 of said clamp unit lying opposite one another and leaving a slot open between them. A clamping bolt 16 is guided through two bores 31, 32 in the upper ends 29, 30, which clamping bolt bridges the slot formed between the two upper ends 29, 30. A tensioning mechanism 33 is arranged at one end of the clamping bolt 16, which tensioning mechanism can be actuated by means of an actuating lever 34. The tensioning mechanism 33 depicted schematically in FIG. 4 comprises a cam disk 331 which is connected in a non-rotatable manner to the actuating lever 34 and a sliding plate 332 which engages in a non-rotatable manner with an opening in a clamping jaw 35. Through a rotation of the actuating lever 34, the cam disk 331 turns in respect of the sliding plate 332, as a result of which a clamping hub is provided in the direction of the longitudinal axis of the clamping bolt, through which the steering column is displaced into the fixing position. Through the reverse rotation of the hand lever, a movement into the release position is achieved. When the actuating lever 34 is actuated into a release position, the clamping grip of the clamp unit 23 opens, so that the actuating unit 2 is displaceable both in the axial direction 5 and also in the vertical direction 6, so that the position of the steering wheel sitting at the free end of the steering shaft 3 and not shown here can be changed. Once the desired position has been found, the actuating lever 34 is moved into the fixing position. In this way, the upper ends 29, 30 of the clamp unit 28 are moved towards one another, so that the slot formed between them becomes smaller, i.e. the slot narrows. At the same time, the outsides of the clamp unit 28 are clamped between two clamping jaws 35, 34 which project downwards from the holding unit 4 substantially parallel to one another and enclose between them the actuating unit 2 along with the clamp unit 28.

An energy absorption device 8 according to the invention comprises a piece of sheet metal which has been produced from a single sheet-metal cutout by a small number of punching and bending actions. The energy absorption device 8 has a substantially central portion 11 which bridges the gap formed between the upper ends 29, 30 of the clamp unit 28 and two clamping portions 12, 13 which project downwards starting from the central portion 11 and enclose the clamp unit 28. The clamping portions 12, 13 are each provided with an elongate hole 14, 15 which is oriented in an axial direction 5. The clamping portions 12, 13 project into the region of the clamping bolt 16 which goes through the elongate holes 14, 15. Consequently, the clamping portions 12, 13 are clamped during actuation of the clamping device 7 by means of the actuating lever 34 into the fixing position between the outsides of the clamp unit 28 and the insides of the clamping jaws 35, 36 of the holding unit 4. Consequently, the inside of the clamping jaw 35 along with the outer surface of the clamping portion 12 forms a first frictional pairing, in other words a first frictional contact. The outside of the upper end 29 of the clamp unit 28 forms with the inner surface of the clamping portion 12 a second frictional pairing, in other words, a second frictional contact. The clamping portion 13 likewise has a frictional contact with the clamping jaw 36 and the upper end 30. Through each individual frictional contact, a frictional force is produced which is directed against the displacement in an axial direction. The frictional force results from the existing clamping force and the frictional coefficient existing between the frictional surfaces and the number of frictional pairings. Because each of the two clamping portions has two frictional pairings, the frictional force which acts against a displacement of the clamping portion 12, 13 in respect of the holding unit 4 and the clamp unit 28 can be increased fourfold compared with a single frictional pairing. The actuating unit 2 and the external casing tube 200 have an octagonal cross-sectional profile, as a result of which the actuating unit 2 and the external casing tube 200 come into frictional contact through the clamp unit 28 via the clamping surfaces 201, 202. Because the clamping force is applied in the direction of the clamping bolt 16, an increase can be achieved in the frictional force acting between the actuating unit 2 and the external casing tube 200 due to the angular relationship compared with a purely circular cylindrical contact surface. However, the frictional force acting between the actuating unit 2 and the external casing tube 200 is smaller than the frictional force that fixes the clamping portions 12, 13 in the axial direction 5. Consequently, in the event of a crash, it is possible to ensure that the actuating unit 2 slides into the external casing tube 200 despite the acting friction and energy absorption and the clamping portions 12, 13 remain in the clamped position without slipping through between the clamp unit 28 and the clamping jaws of the holding unit 4.

The energy absorption by the energy absorber 9, 10 preferably only takes place after the breaking free, i.e. after the actuating unit 2 has slipped away from the external casing tube 200. The advantage of this is that before the additional energy absorption starts, the static friction between the actuating unit 2 and the external casing tube 200 can be overcome.

The central portion 11 of the energy absorption device 8 contains an energy absorber 9, 10. In the case of the embodiment depicted in FIGS. 3 to 8 the energy absorber comprises a bending/tear tab, the free end 19 whereof is bent under and is fixedly connected to the upper side of the actuating unit 2 by means of a screw connection 37. Likewise, an alternative connection can be used, for example a rivet connection, caulking or a joining connection such as welding. When the clamping device 7 is in the release position, the actuating device 2 takes along the energy absorption device 8 fixedly connected to it in each direction during displacement of the steering column, wherein displacement in the axial direction 5 is facilitated by the elongate holes 14, 15 of the clamping portions 12, 13, so that the clamping portions 12, 13 can slide along in the axial direction 5 on the clamping bolt 16 penetrating the elongate holes 14, 15.

While the vehicle is operating normally, the clamping device 7 is in the fixing position, while the actuating unit 2 and the energy absorption device 8 are clamped. If, as a consequence of a vehicle crash, forces occur in an axial direction 5, the steering wheel sitting on the end of the steering shaft 3 may be displaced forwards, wherein the actuating unit 2 is pushed in an axial direction 5 in respect of the clamp unit 28 and the holding unit 4 and compressed in a telescopic manner into the external casing tube 200. The clamping portion 12, 13 of the energy absorption device 8, on the other hand, remain fixed in the clamping grip between the clamp unit 28 that cannot be displaced in an axial direction 5 during the crash and the holding unit 4 that cannot be displaced in the axial direction 5 during the crash. In other words, in the event of a crash there is no relative movement between the holding unit 4, the clamping portion 12, 13 and the clamp unit 28, i.e. they are unmoved in respect of one another and do not change their position in respect of one another. Therefore, the actuating unit 2 pulls on the bending/tear tab 9 via the screw connection 37 which is thereby constantly deformed and "rolls off" in the axial direction 5. As a result of this, the movement of the steering column 3 in the axial direction 5 is limited and cushioned.

Figure 7:
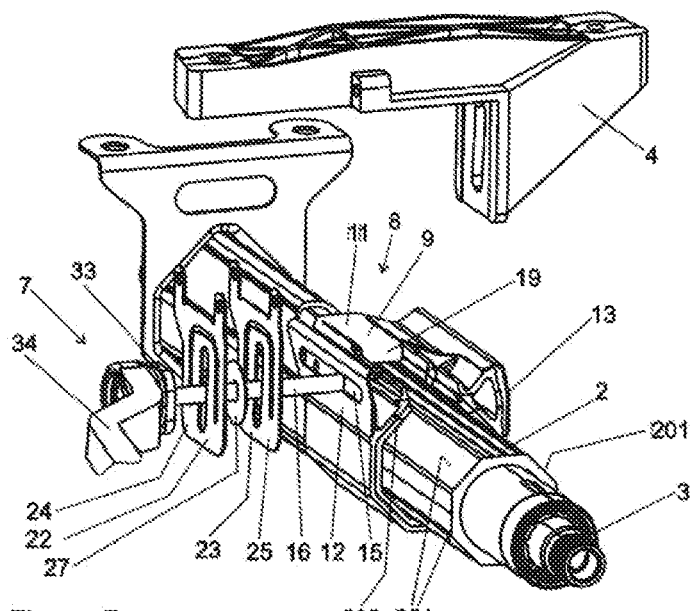
FIG. 7 is a partially exploded view of another example steering column.
Figure 8:
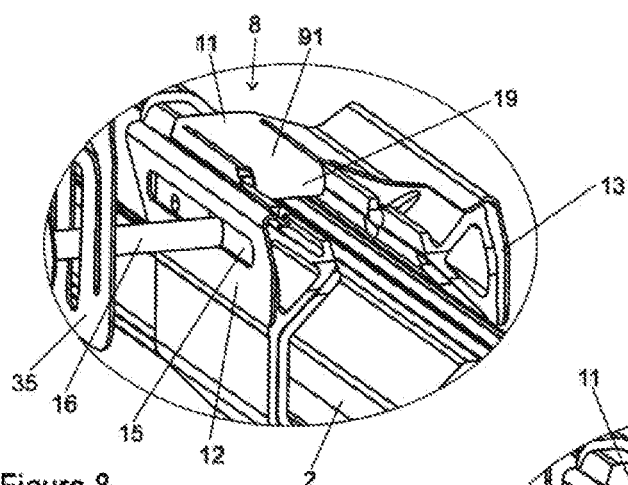
FIG. 8 is an enlarged detailed view of the example steering column from FIG. 7 with an example energy absorption device with a bending tab.

An alternative embodiment with a bending tab 91 rather than a bending/tear tab is depicted in FIG. 8. All other components have an identical design and an identical function to those in FIGS. 1 to 7.

Figure 9:
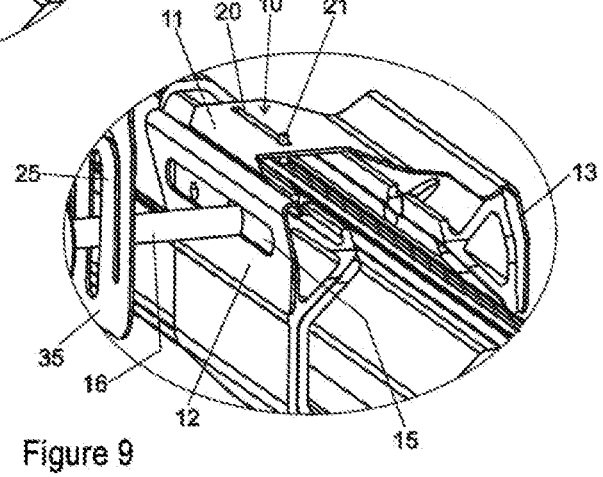
FIG. 9 is an enlarged detailed view of the example steering column from FIG. 7 with an energy absorption device with an elongate hole and displaceable pin.

In another embodiment of the invention, the energy absorber 10 is configured in the form of a sliding block 21 that can be displaced in a slot 20. This embodiment can be seen in FIG. 9. In this case, the sliding block 21 is configured in the form of a pin and fixedly connected to the actuating unit 2. The slot 20 is slightly narrower than the width of the sliding block 21, which means that this can only be moved through the slot 20 with a substantial expenditure of force and energy. This causes the slot 20 to be widened and the energy introduced due to the deformation absorbed. The slot 20 is formed in the central portion 11 of the energy absorption device 8. If the clamping device 7 is in the release position, the actuating unit 2 can be displaced in respect of the holding unit 4 both in the axial direction 5 and also in the vertical direction 6, wherein the energy absorption device 8 can slide along its elongate holes 14, 15 on the clamping bolt 16 and the clamp unit 28 in an axial direction 5.

If the clamping device 7 is moved into the fixing position, the actuating unit 2 is in turn clamped along with the external casing tube 200 of the clamp unit 28 and the energy absorption device 8 in the clamping device 7. If as a result of a vehicle crash extremely strong forces act in the axial direction 5, the actuating unit 2 is displaced within the clamp unit 28 and the external casing tube 200 in the axial direction 5, while the energy absorption device 8 remains clamped at its clamping portions 12, 13 in the clamping device 7. There is therefore now a relative movement in an axial direction 5 between the actuating unit 2 with the sliding block 21 fastened thereto and the energy absorption device 8, during which the sliding block 21 is drawn through the slot 20 of the energy absorber 10 and the slot 20 is widened in the process. The energy absorbed during the reshaping of the slot 20 causes the movement of the actuating unit 2 to be limited or cushioned in the axial direction 5.

As can be seen in FIG. 7, a clamping jaw 35 of the holding unit 4 may comprise two plates 22, 23. The advantage of this is that an improved frictional fixing of the clamping portion 12 of the energy absorption device 8 is achieved, as further frictional pairs are provided for fixing the clamping portion 12. For further improvement of the fixing, a frictional plate 27 is arranged between the plates 22, 23.

Figure 3:
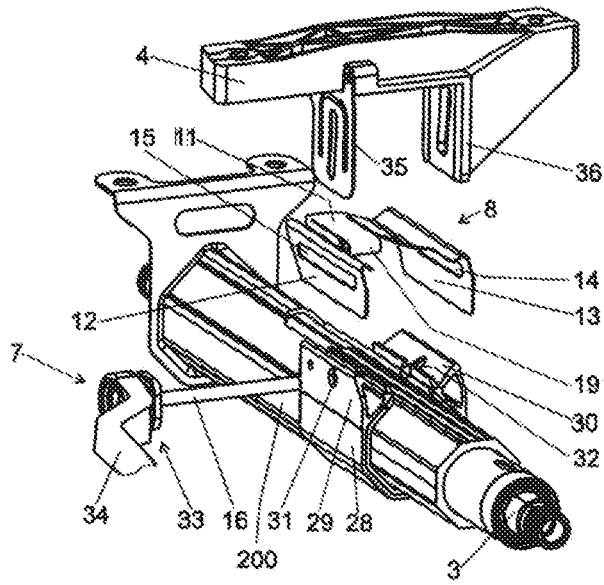
FIG. 3 is a partially exploded view of the example steering column according to FIGS. 1 and 2.
Figure 4:
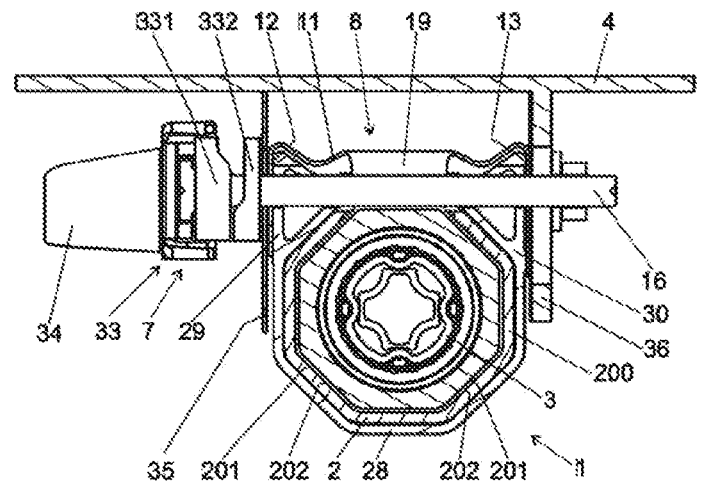
FIG. 4 is a schematic cross-sectional view of the example steering column according to FIGS. 1 and 2.
Figure 5:
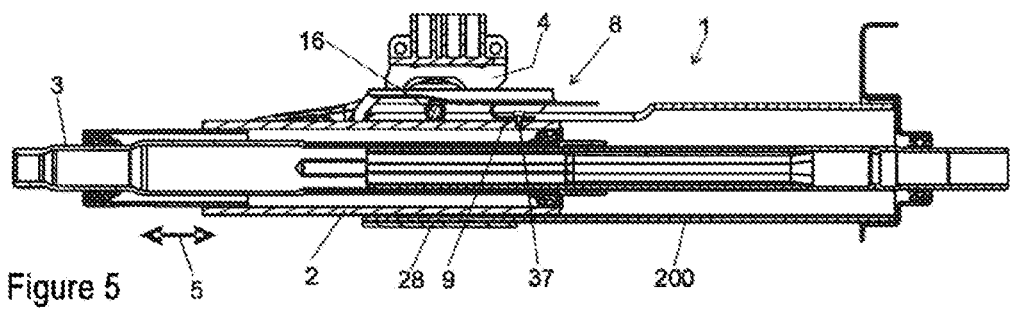
FIG. 5 is a longitudinal sectional view of the example steering column according to FIG. 1 prior to a head-on collision involving the vehicle.
Figure 6:
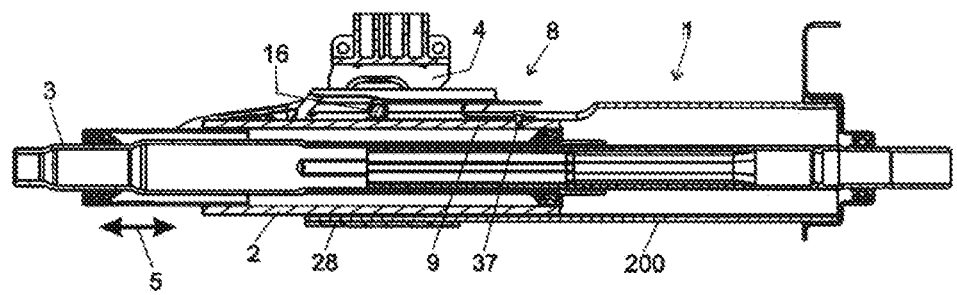
FIG. 6 is a longitudinal sectional view of the example steering column according to FIG. 5 following a head-on collision involving the vehicle.
Figure 11:
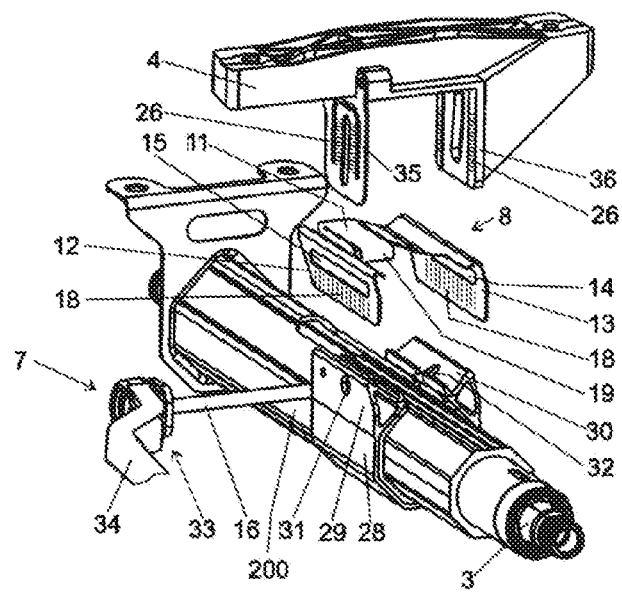
FIG. 11 is a partially exploded view of yet another example steering column.

In FIG. 11 a steering column is depicted in a similar way to FIG. 3, wherein the clamping surfaces of the clamping jaw 35, 36 and the clamping surfaces of the clamping portions 12, 13 of the energy absorption device 8 may be provided with a friction-improving coating or be roughened 18, 26 in order to increase the coefficient of friction, also referred to as the friction coefficient. It is likewise conceivable and possible for only the clamping surfaces of the clamping jaw or the clamping surface of the clamping portion to be roughened 18, 26.

On account of the shape which can be clearly seen in FIGS. 3 and 7 to 9 in particular, the energy absorption device 8 is particularly stiff in the crash loading direction, i.e. in the axial direction 5, and soft in the clamping direction, in other words in the direction of the clamping bolt 16.

The energy absorber 10 of the energy absorption device 8 may be configured as a bending tab, as described, but also as a bending/tear tab, wherein the bending/tear tab is only prescribed by material-weakening impressions in the sheet metal of the energy absorption device 8. In the event of a crash, the bending/tear tab must first be detached from the remaining sheet metal of the energy absorption device 8, as a result of which energy is absorbed. Further energy is absorbed by the bending, in other words the plastic deformation, of the bending/tear tab.

Apart from the alternative embodiment described in greater detail of an energy absorber 10 in the form of a sliding block 21 or a pin pulled through a slot 20, an energy absorber according to the invention may also be used in other alternative embodiments, in particular in the form of a frictional element or by a machining plane.

Figure 10:
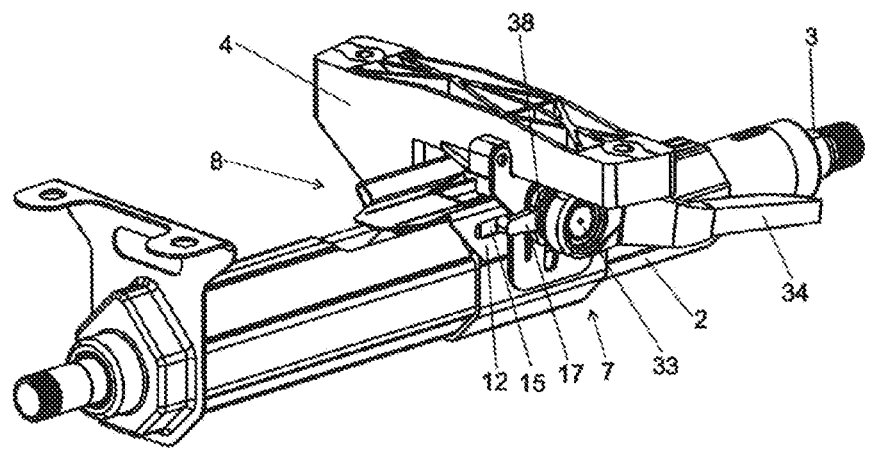
FIG. 10 is a perspective view of still another example steering column with an anti-rotational device for an energy absorption device.

In order to prevent rotation of the energy absorption device 8 in the event of a crash, a form fit may optionally be provided in which case the energy absorption device 8 is supported by a counter-element. The elongate holes 14, 15 in the clamping portions 12, 13 of the energy absorption device 8 which are in any event present, for example, may be used for this purpose. As the counter-element it is proposed that a cam 17 should be provided in the region of a slide plate 332 of the tensioning mechanism 33 which engages with the elongate hole 15. A device of this kind is depicted in FIG. 10.

LIST OF REFERENCE NUMBERS

1 Steering column
2 Actuating unit
3 Steering shaft
4 Holding unit
5 Axial direction
6 Vertical direction
7 Clamping device
8 Energy absorption device
9 Energy absorber
10 Energy absorber
11 Central portion
12 Clamping portion
13 Clamping portion
14 Elongate hole
15 Elongate hole
16 Clamping bolt
17 Cam
18 Roughening
19 Free end
20 Slot
21 Sliding block/pin
22 Plate
23 Plate
24 Clamping surface
25 Clamping surface
26 Roughening
27 Friction disk
28 Clamp unit
29 Upper end
30 Upper end
31 Bore
32 Bore
33 Tensioning mechanism
34 Actuating lever
35 Clamping jaw
36 Clamping jaw
37 Screw connection
38 Sliding plate
55 Longitudinal axis

What is claimed is:

1. A displaceable steering column for a motor vehicle comprising:

an actuating unit in which a steering shaft is rotatably mounted, wherein the actuating unit is displaceable relative to a holding unit that is fixed to the vehicle body in an axial direction of the steering shaft, wherein the actuating unit is configured to be clamped by a clamping device so as to fix the actuating unit in a non-displaceable manner relative to the holding unit under normal operation of the motor vehicle; and an energy absorption device disposed between the actuating unit and the holding unit, the energy absorption device including a central portion on which an energy absorber is directly disposed, wherein the energy absorber is coupled with the actuating unit, wherein the central portion is connected to a clamping portion of the energy absorption device that is configured to be clamped by the clamping device, wherein the clamping portion is provided with an elongated hole that extends in the axial direction and is sized and shaped to receive therethrough a clamping bolt of the clamping device.

2. The displaceable steering column of claim 1 wherein a cam supported on the holding unit projects as an anti-rotational device for the clamping portion through the elongate hole.

3. The displaceable steering column of claim 1 wherein the clamping portion is a first clamping portion, wherein the first clamping portion and a second clamping portion are disposed on opposite sides of the central portion and extend parallel to one another.

4. The displaceable steering column of claim 1 wherein the clamping portion comprises a roughening or a fluting.

5. The displaceable steering column of claim 1 wherein the energy absorber is configured as a bending tab, a tear tab, or a bending/tear tab that emerges from the central portion and is bent over at a free end, wherein the free end that is bent over is coupled with the actuating unit.

6. The displaceable steering column of claim 1 wherein the energy absorber is configured as a sliding block that is displaceable in a slot, wherein a width of the sliding block is greater than a width of the slot such that the sliding block widens the slot when the sliding block is displaced in the slot, wherein the sliding block is connected to the actuating unit and projects through the slot arranged in the central portion of the energy absorption device.

7. The displaceable steering column of claim 1 wherein the energy absorber is configured as a punched/bent sheet-metal part.

8. The displaceable steering column of claim 1 wherein a clamping jaw of the holding unit comprises two plates.

9. The displaceable steering column of claim 8 wherein clamping surfaces of the plates include a roughening or a friction-improving coating.

10. The displaceable steering column of claim 8 wherein a friction disk is disposed between the plates.

* * * * *